United States Patent
Zhu et al.

(10) Patent No.: US 8,244,297 B2
(45) Date of Patent: *Aug. 14, 2012

(54) PREVENTING SELF-INDUCED INTERFERENCE IN DUAL-RADIO DEVICE

(75) Inventors: Jing Z. Zhu, Hillsboro, OR (US); Hsin-Yuo Liu, San Jose, CA (US); Xue Yang, Portland, OR (US); Xingang Guo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 951 days.

This patent is subject to a terminal disclaimer.

(21) Appl. No.: 11/638,008

(22) Filed: Dec. 12, 2006

(65) Prior Publication Data

US 2008/0139200 A1   Jun. 12, 2008

(51) Int. Cl.
 *H04M 1/00* (2006.01)
(52) U.S. Cl. .......... 455/553.1; 455/426.2; 455/445; 455/456.4; 455/63.1; 455/552.1
(58) Field of Classification Search ....... 455/426.1–445; 370/310.2–350, 442–448
See application file for complete search history.

(56) References Cited

U.S. PATENT DOCUMENTS

| | | | |
|---|---|---|---|
| 5,537,685 A | 7/1996 | Matsuno | |
| 5,561,437 A * | 10/1996 | Phillips et al. | 343/702 |
| 6,094,421 A | 7/2000 | Scott | |
| 6,161,009 A * | 12/2000 | Skurdal et al. | 455/423 |
| 6,600,726 B1 | 7/2003 | Nevo et al. | |
| 6,895,255 B1 | 5/2005 | Bridgelall | |
| 6,982,949 B2 | 1/2006 | Guo et al. | |
| 7,046,649 B2 | 5/2006 | Awater et al. | |
| 2003/0027585 A1 | 2/2003 | Ohnishi | |
| 2005/0286476 A1 | 12/2005 | Crosswy et al. | |
| 2006/0105771 A1 * | 5/2006 | Iacono et al. | 455/446 |
| 2007/0066314 A1 * | 3/2007 | Sherman et al. | 455/445 |
| 2008/0102885 A1 * | 5/2008 | Tu et al. | 455/553.1 |
| 2008/0139212 A1 * | 6/2008 | Chen et al. | 455/450 |

FOREIGN PATENT DOCUMENTS

| | | |
|---|---|---|
| JP | 2001217853 A2 | 8/2001 |
| JP | 2002319948 A2 | 10/2002 |
| JP | 2003051832 A2 | 2/2003 |
| JP | 2005348397 A2 | 12/2005 |

(Continued)

OTHER PUBLICATIONS

International Search Report and Written opinion received for PCT Patent Application No. PCT/US2007/084094, mailed on Apr. 29, 2008, 10 pages.

(Continued)

*Primary Examiner* — Dai A Phuong
(74) *Attorney, Agent, or Firm* — Schwabe, Williamson & Wyatt, P.C.

(57) ABSTRACT

In a wireless device that includes two different radio transceivers that communicate in two different wireless networks, wireless transmissions from one radio in the first network may be timed so that they do not coincide with wireless receptions by the other radio in the second network. A non-wireless interface between the two radios may be used to convey information about the scheduled reception times so that the transmission will not be scheduled during those reception times. This may be particularly useful when the receiving radio is operating in a centralized and highly scheduled network, while the transmitting radio is operating in a more decentralized network.

14 Claims, 3 Drawing Sheets

FOREIGN PATENT DOCUMENTS

| | | |
|---|---|---|
| JP | 2006521714 T2 | 9/2006 |
| JP | 2008523765 T2 | 7/2008 |
| WO | WO2004/045082 A2 | 5/2004 |
| WO | WO2006/012018 A1 | 2/2006 |
| WO | WO2006/065069 A1 | 6/2006 |
| WO | 2008/073650 A1 | 6/2008 |

OTHER PUBLICATIONS

International Preliminary Report on Patentability received for PCT Patent Application No. PCT/US2007/084094, mailed on Jun. 25, 2009, 6 pages.

Office Action issued Oct. 18, 2011 from Japanese Patent Application No. 2009-541442.

Office Action issued Feb. 21, 2012 from Japanese Patent Application No. 2009-541442.

Office Action mailed Dec. 31, 2011 in Chinese Application No. 200780045822.X.

Office Action mailed Nov. 18, 2010 in Korean Application No. 2009-7012249.

Final Rejection mailed Jul. 27, 2011 in Korean Application No. 2009-7012249.

Notice of Allowance mailed Jan. 12, 2012 in Taiwan Application No. 96143695.

* cited by examiner

PREVENTING SELF-INDUCED INTERFERENCE IN DUAL-RADIO DEVICE

BACKGROUND

Increasingly, a single computing or communications device, such as a laptop, handheld, cell phone, etc. will have multiple radios to communicate over multiple types of networks, such as both a wireless local area network (WLAN) and a wireless wide area network (WWAN). Even though the different types of networks may use different communications technology and operate over different frequency bands, harmonics and other forms of cross-band radio frequency (RF) leaking can cause multiple radios located in the same device to interfere with each other. One of the most destructive cases can happen when one radio is transmitting and the other is receiving. Since the two radios are located extremely close to each other, the receiving radio may receive a signal from the transmitting radio that is many times stronger than the signal the receiving radio is trying to receive. This difference in signal strength may result in the transmitting radio overwhelming the receiving radio, preventing the receiving radio from recognizing its intended signal.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
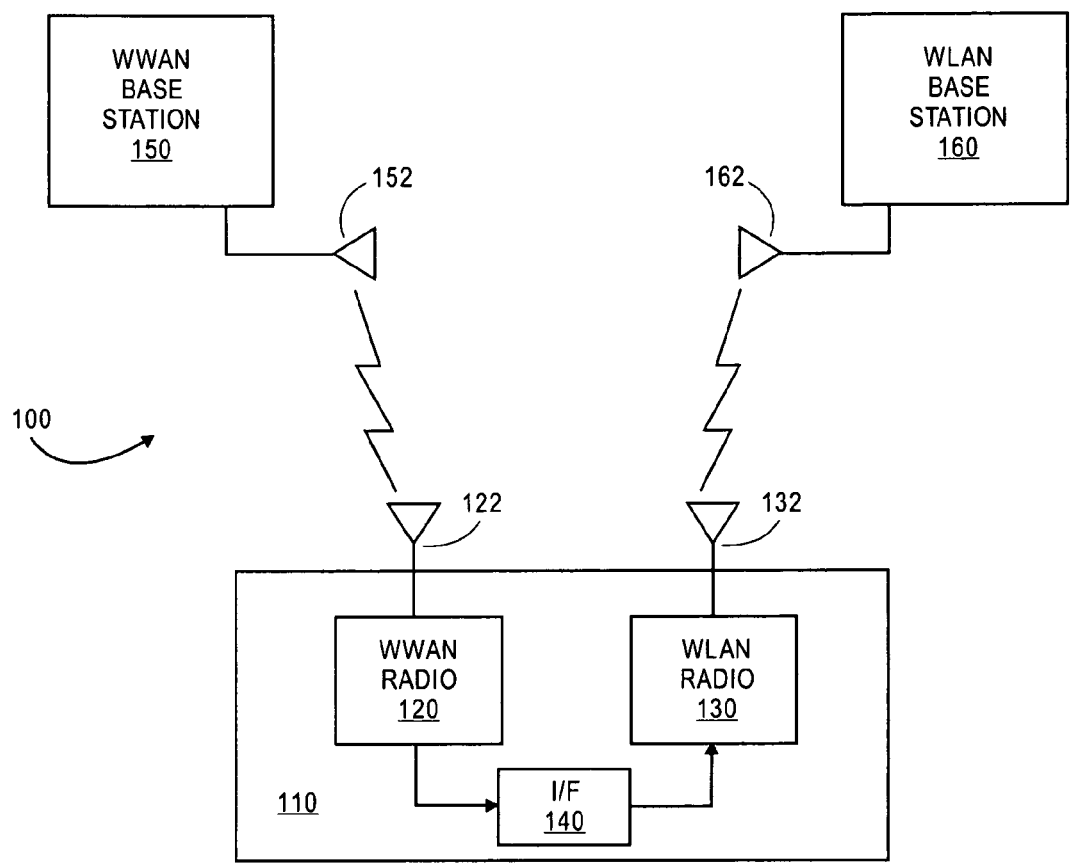
FIG. 1 shows a dual-radio device communicating in two networks, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "mobile wireless" is used in connection with a wireless device that may be in motion while it is communicating.

Some embodiments of the invention pertain to a wireless device that includes two different radio transceivers which communicate in two different wireless networks. Wireless transmissions from one radio may be timed so that they do not overlap wireless receptions by the other radio. A wired interface between the two radios may be used to convey information about the scheduled reception times so that the transmissions will not be made during those reception times. This may be particularly useful when the receiving radio is operating in a centralized and highly scheduled network, while the transmitting radio is operating in a more decentralized network.

FIG. 1 shows a dual-radio device communicating in two networks, according to an embodiment of the invention. A wireless communications device 110 may include a first radio 120 to communicate with a first base station 150 and a second radio 130 to communicate with a second base station 160. The wireless communications device may be any feasible device, such as but not limited to a notebook computer, a personal data assistant, etc. The wireless communications device 110 may sometimes be referred to as a mobile station. A 'radio', as used herein, may include the hardware, software, and/or firmware needed to make the device communicate effectively in the indicated wireless network, and may include elements of both physical layer (PHY) and medium access layer (MAC) functionality. In the illustrated embodiment, the first radio and first base station are shown as being compatible with a wireless wide area network (WWAN), while the second radio and second base station are shown as being compatible with a wireless local area network (WLAN), but other embodiments may be compatible with other types of networks. Also, a base station may combine both types of radio in a single device, as is shown for the mobile station. Because these devices are communicating wirelessly, each is shown with an antenna 122, 132, 152, and 162, respectively. Any feasible type of antenna may be used on any of these devices, such as but not including a monopole antenna, a dipole antenna, etc.

A non-wireless (i.e., wired, fiber optic, etc.) interface 140 is shown coupled between the two radios. This interface may be used to transfer timing information from radio 120 to radio 130 about one or more upcoming time periods in which the radio 120 is scheduled to receive a signal from another device, such as base station 150. In some types of networks, the base station 150 may schedule downlink communications to a mobile station (e.g., transmissions from the base station 150 to a mobile station 110 in the same network), and inform the mobile station of the schedule through a wireless communication. Once the radio 120 receives this schedule, it can generate timing information that indicates when the next reception will occur, and pass that information on to radio 130 through interface 140. Although radio 130 may not participate in that scheduled reception, it may use the timing information to adjust the timing of its own transmissions.

Interface 140 may be any feasible type of non-wireless interface that will communicate timing information quickly enough and accurately enough to meet the requirements of the system. For example, in various embodiments, interface 140 may: 1) be dedicated to this function, or may also perform other functions, 2) may be dedicated to these two radios, or may also serve as an interface for other devices, 3) may transfer the information serially, in parallel, or in some combination of those, 4) may communicate only from radio 120 to radio 130, or may communicate in both directions, 5) may include or not include a bus. Other criteria may also be relevant. Interface 140 may transfer sufficient bits of information to satisfy the granularity requirements of the system, with the least significant bit representing a predefined period of time. For example, if the values have a granularity of 1 microsecond (us), and the interface transfers 6-bit values, each transferred value may represent integer values from 0 to 63 us. In other embodiments, more or fewer bits may be transferred to represent a different range of values, and the granularity may be in smaller or larger units than a microsecond. For example, some particular embodiments may have a granularity in the range of 7-11 us (e.g., approximately 9 us), but other embodiments may use other granularity. The interface may also have a known transfer delay (i.e., the length of time it takes to transfer data from the first radio to the second radio). If this delay is known, and if it is large enough to affect operations, then the timing information may be adjusted to accommodate this delay.

Figure 2:
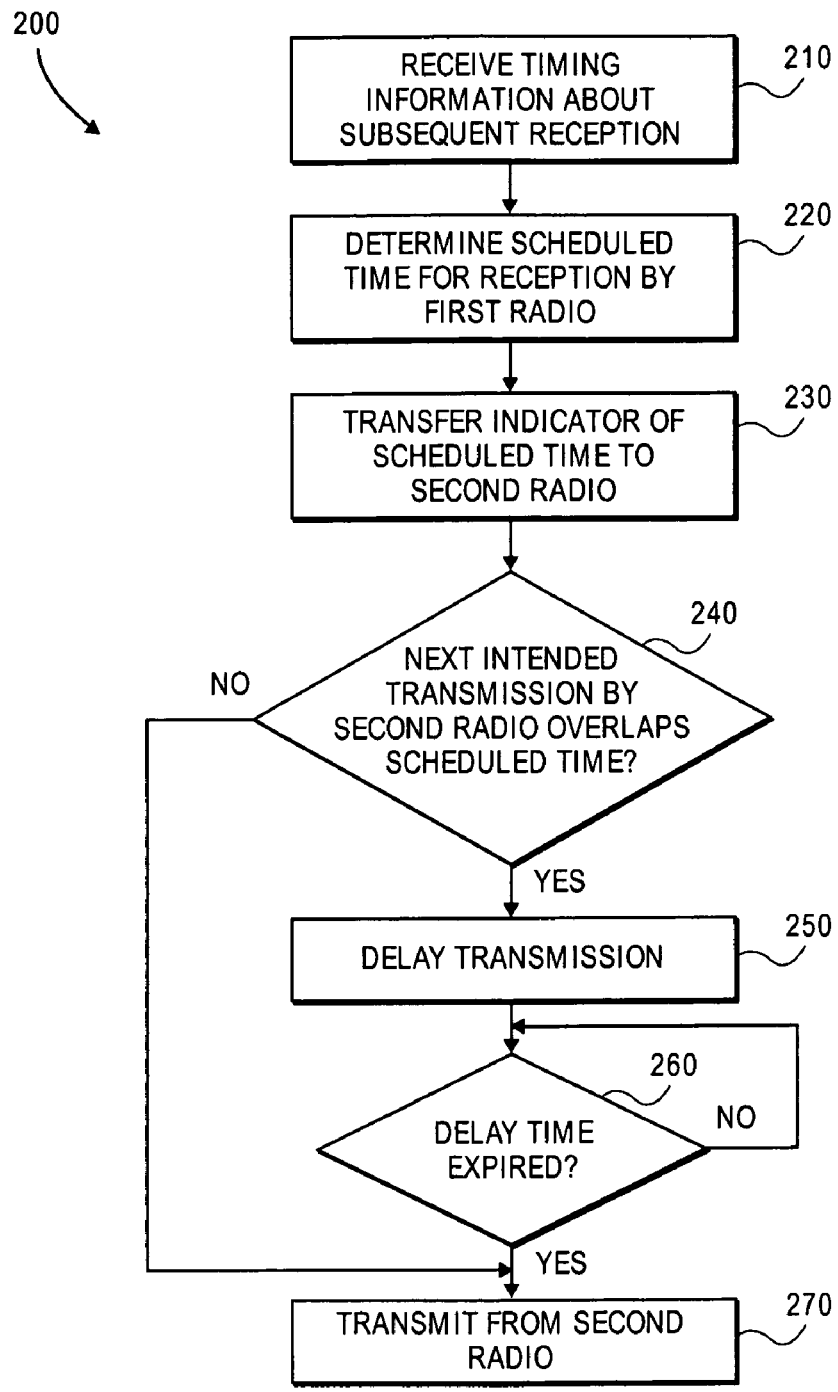
FIG. 2 shows a flow diagram of a method, according to an embodiment of the invention.

FIG. 2 shows a flow diagram of a method, according to an embodiment of the invention. In flow diagram 200, at 210 a first radio in the communications device may receive timing information from its associated base station indicating when a particular transmission from the base station is scheduled to be received by the first radio. Depending on the format in which this information was received, it might need to be converted at 220 into a reference time format that is meaningful to a second radio in the communications device. At 230 this indicator may be transferred to the second radio over an internal interface. When the second radio intends to make a transmission to its own base station, it may compare the intended transmission period with the previously-received indicated reception time of the first radio. If these do not overlap, as indicated at 240, the second radio may make its transmission at 270. However, if these do overlap, the second radio may delay its transmission at 250 until the indicated reception time for the first radio has expired at 260. The second radio may then make its transmission at 270. In this manner, the second radio will not be transmitting when the first radio is trying to receive, so the first radio should not see any cross-radio interference from the second radio.

Figure 3A:
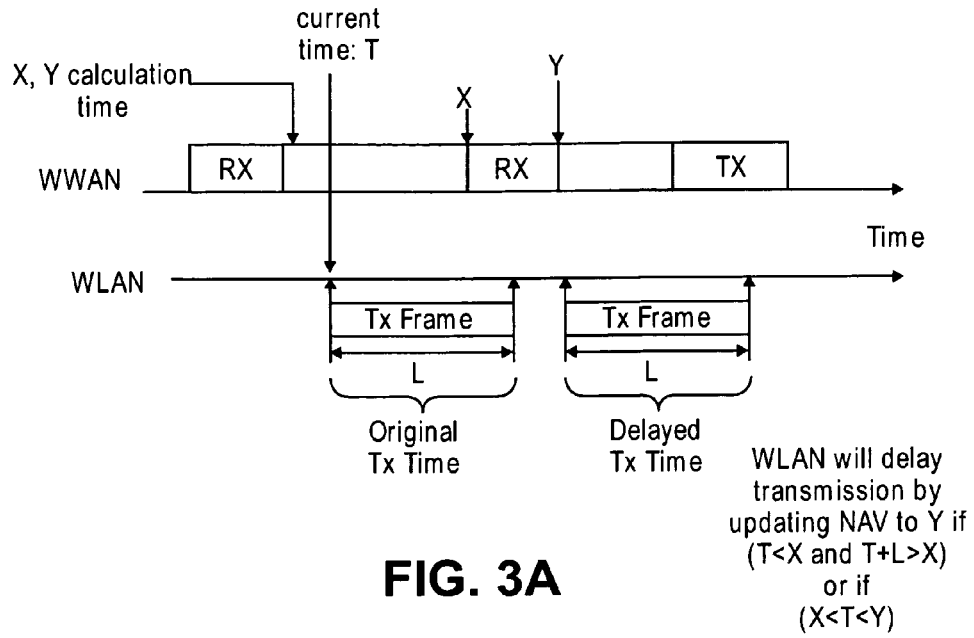
FIGS. 3A and 3B show timing diagrams of communications by the first and second radios, according to various embodiments of the invention.
Figure 3B:
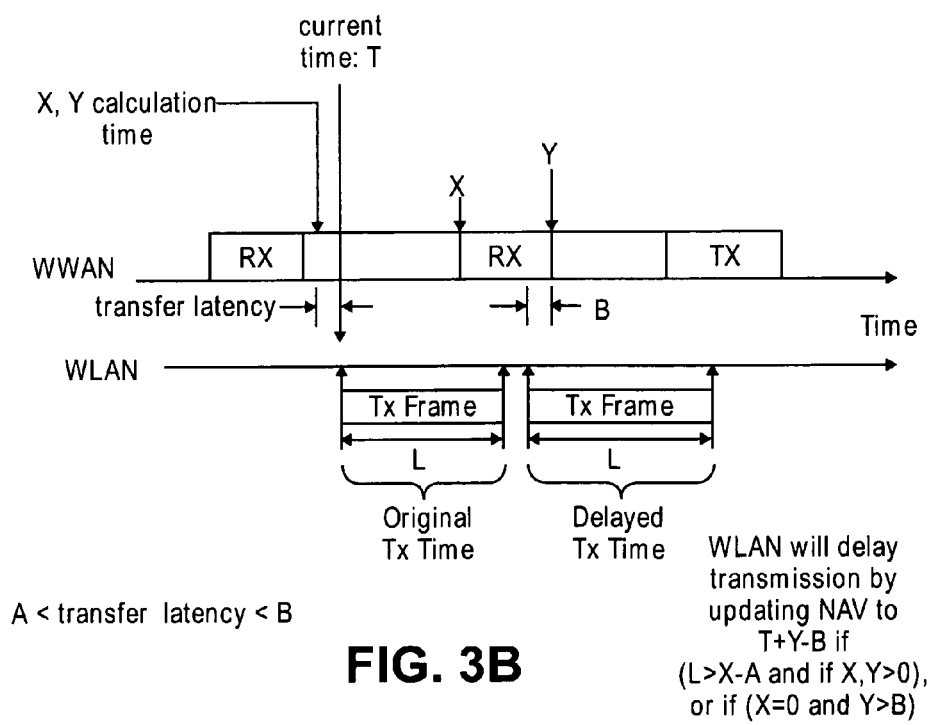

FIGS. 3A and 3B show timing diagrams of communications by the first and second radios, according to various embodiments of the invention. Both drawings indicate the two radios are operating in WWAN and WLAN networks, respectively, but this is only for the illustrated example. Other types of network-compliant radios may also be used. The timing information transferred from the first radio to the second radio may be relative to either of two time bases. In FIG. 3A the indicated time is relative to a common clock base which both radios have. In this technique, each radio may be synchronized to a standard time base, which may be received in various ways. For example, a standardized clock time may be received by each radio, and periodically updated to maintain time synchronization between the two radios. Highly accurate clock standards are available to base stations for this purpose, such as satellite-based clocks, so that clock synchronization over an entire region is feasible. In another embodiment, the wireless communications device may have its own internal clock reference available to both radios, so that both radios may be synchronized with each other. In this embodiment, the first radio may have to convert its scheduled reception times to this internal clock reference before passing the timing information on to the second radio. Regardless of how the timing base is generated that is used by both radios, a timing indicator provided by the first radio will still be accurate when used by the second radio, even if there is a delay in transferring the indicator between radios, because the time used by both radios is based on a common clock reference.

In FIG. 3A, X denotes the start of the next scheduled reception by the WWAN radio, and Y denotes the end of that scheduled reception, as those values are determined at a previous time (e.g., at the time marked as 'X, Y calculation time'). T denotes the current time at which the WLAN radio is determining when to start its next transmission. All may be expressed as clock times, based on the common time reference being used by both radios. L represent the duration of the next transmission that is intended by the WLAN radio. When the WLAN radio is preparing to make a transmission, the WLAN radio can compare X, Y and L, and may determine that if it makes its transmission immediately, that transmission will overlap the scheduled reception time for the WWAN radio, thereby causing possible interference for the WWAN radio. In the illustrated example, such an overlap is indicated if $T<X$ (the reception has not started yet) and $T+L>X$ (the reception will have started before the WLAN transmission completes if the WLAN transmission starts now). An overlap is also indicated if $X<T<Y$ (the reception is currently in progress). If an overlap is indicated, the WLAN radio may delay its transmission until the scheduled reception time for the WWAN radio is completed at time Y. One way of delaying an intended transmission is by using a network allocation vector (NAV), which wireless devices in WLAN networks frequently use as an internal indicator that they should not transmit while the NAV is effective. The duration of the NAV can be set to expire at time Y, so that the transmission will occur at the illustrated 'Delayed Tx Time' rather than at the illustrated 'Original Tx Time'. Of course, if no overlap is indicated, the WLAN may immediately make its transmission.

In FIG. 3B, there is no synchronized clock that is shared by both radios (at least not for these calculations). X and Y denote time periods that are measured from the time at which the WWAN radio was determining those values (labeled as 'X,Y calculation time' in FIG. 3B). If X is a negative number (i.e., if the WWAN reception period has already started when the WWAN is determining the values for X and Y), then X may be set to 0 for the subsequent calculations by the WLAN radio. In various embodiments, setting a negative X to 0 may be done by either radio. In the embodiment represented by FIG. 3B, T represents the time at which the WLAN radio is making its calculations. L is still the duration of the intended transmission by the WLAN radio. This scenario might be handled the same as the example of FIG. 3A, except when the time it takes to transfer the timing information from the first radio to the second radio is significant enough to affect the timing relationships between the two radios. This delay, referred to here as transfer latency, may vary greatly depending on the type of interface used to effect the transfer. For example, an interface consisting of a simple register may make the timing information available to the second radio within a few nanoseconds, while an interface containing a shared bus might require multiple microseconds to make the transfer. Transfer latency may also depend on how often the WWAN radio updates the values of X and Y, since the values may be stale by the time the WLAN radio reads them. Transfer latency may include any or all of these factors. Transfer latency may therefore not be consistent, and may vary within a range of values. In the example shown, A denotes the minimum transfer latency, while B denotes the maximum transfer latency, considering the particular technology and techniques used. Determining whether a transmission by the WLAN radio, if started immediately, will overlap the scheduled reception time for the WWAN radio, should take the transfer latency into account. This may be important if the maximum transfer latency B is much greater than the granularity of the time values being transferred between the two radios.

The WWAN radio may determine the timing values X and Y with reference to the time at which those values are being determined But due to transfer latency, the WLAN radio will use those values at a time period that is somewhere between A and B after those calculations were made. Due to the time that elapses during the transfer period, when the WLAN radio uses the values of X and Y, they no longer represent the remaining time until the start and end of the WWAN reception period. If simple calculations similar to those of FIG. 3A are used, the WLAN radio's calculation of when the next WWAN reception period starts and ends will be inaccurate (too late) by an amount of time somewhere between A and B. This amount of inaccuracy in the calculation might be unacceptable in many applications.

The WLAN radio may not know exactly how much the inaccuracy will be, only that it falls between the values of A and B. The WLAN radio may therefore adjust its calculations by assuming the worst case values. When determining whether its next transmission, if started immediately, will overlap the next WWAN reception, it may assume such an overlap will occur if $L>X-A$. A transfer latency greater than A, but less than B, may or may not result in the overlap, but since the exact transfer latency is not known, using the minimum value may prevent unintended overlap. If an overlap is deemed to be possible, the WLAN radio may delay its transmission until $T+Y-B$, where T is the time at which the WLAN radio is making the determination of overlap and delay values. As before, this delay may be implemented by setting a NAV to this value, but other embodiments may use other techniques to implement a transmission delay.

Other calculations may also affect whether the WLAN radio's transmission is delayed. For example, if X and Y are both greater than zero (i.e., the reception period in the WWAN radio had not started when it determined values for X and Y), or if $X=0$ and $Y>B$ (i.e., a reception period for the WWAN radio was in progress at time the WWAN radio determined X, but will be ended by time the WLAN radio determines Y, based on maximum transfer delay), then the aforementioned delay should be followed by the WLAN radio in determining when to transmit. If X and Y are both negative numbers (or were reset to 0 because they were negative numbers), the indicated WWAN reception period was already over when the values of X and Y were calculated by the WWAN radio. This may indicate that the values of X and Y are obsolete, and no valid information may be obtained from them until the values of X and Y are updated again by the WWAN radio. This situation may occur if X and Y values for an in-progress reception period are provided by the WWAN radio. In some embodiments, the WWAN radio may update the X and Y values on a regularly scheduled basis, without regard to the time of the next scheduled reception period.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising
a device for communicating wirelessly with other devices, the device including:
a first radio that is compatible with a wireless wide area network (WWAN) to receive a schedule, from a base station of the WWAN, the schedule to indicate when the first radio is scheduled to receive a signal over the WWAN;
a second radio that is compatible with a wireless local area network (WLAN); and
a non-wireless interface to convey, from the first radio to the second radio, timing information to indicate a reception time when the first radio is scheduled to receive the signal over the WWAN based on the schedule received by the first radio;
wherein the timing information is relative to a clock common to the first radio and the second radio, the reception time has a start time, X, and an end time, Y, and the second radio is configured to compare, at a time T, an intended transmission period, L, of the second radio over the WLAN with the reception time of the first radio and to not transmit if $T<X$ and $T+L>X$ or if $X<T<Y$.

2. The apparatus of claim 1, wherein the non-wireless interface comprises a bus.

3. The apparatus of claim 1, wherein the non-wireless interface comprises a parallel-data interface.

4. The apparatus of claim 1, wherein the non-wireless interface comprises a serial-data interface.

5. The apparatus of claim 1, wherein the timing information comprises a value for a network allocation vector (NAV) used by the second radio.

6. The apparatus of claim 1, further comprising a first dipole antenna coupled to either of the first radio and the second radio.

7. The apparatus of claim 1, wherein the second radio is configured to delay the intended transmission by setting a value for a network allocation vector (NAV) equal to Y if $T<X$ and $T+L>X$ or if $X<T<Y$.

8. A method, comprising:
receiving, by a first radio compatible with a wireless wide area network (WWAN) from a base station of the WWAN, a schedule to indicate when the first radio is scheduled to receive a signal over the WWAN;
transferring timing information over a non-wireless interface to a second radio contained in a same device as the first radio, the timing information indicating a reception time when the first radio is scheduled to receive the signal over the WWAN based on the indication received by the first radio, wherein the timing information is relative to a clock common to the first radio and the second radio, the reception time has a start time, X, and an end time, Y, and the second radio is compatible with a wireless local area network (WLAN);

comparing, at a time T, an intended transmission period, L, of the second radio over the WLAN with the reception time of the first radio; and preventing transmission over the WLAN by the second radio if T<X and T+L>X or if X<T<Y.

9. The method of claim 8, wherein a network allocation vector is used to prevent transmission over the WLAN by the second radio during the reception time.

10. The method of claim 8, wherein the base station is a first base station and wherein the intended transmission period of the second radio over the WLAN is for an intended transmission period by the second radio to a second base station of the WLAN.

11. An article comprising
a tangible machine-readable medium that contains instructions, which when executed by one or more processors result in performing operations comprising:
receiving, by a first radio that is compatible with a wireless wide area network (WWAN), an indication of when the first radio is scheduled to receive a signal over the WWAN;
transferring timing information over a non-wireless interface from the first radio to a second radio contained in a same device as the first radio, the timing information to indicate a reception time when the first radio is scheduled to receive the signal over the WWAN based on the indication received by the first radio, the second radio being compatible with a wireless local area network (WLAN), wherein the timing information is adjusted to include a range of latency time having a minimum transfer latency A and a maximum transfer latency B for transferring the timing information from the first radio to the second radio, the reception time has a start time, X, and an end time, Y, and the start time X and the end time Y are relative to when the timing information was provided by the first radio;

comparing, at a time T, an intended transmission period, L, of the second radio over the WLAN with the reception time of the first radio; and preventing transmission over the WLAN by the second radio if L>X−A, or if X and Y>0, or if X=0 and Y>B.

12. The article of claim 11, further comprising an operation of using a network allocation vector to prevent transmission over the WLAN by the second radio during the reception time.

13. The article of claim 11, wherein the base station is a first base station and wherein the intended transmission period of the second radio over the WLAN is for an intended transmission by the second radio to a second base station of the WLAN.

14. The article of claim 11, wherein preventing transmission over the WLAN by the second radio comprises setting a value for a network allocation vector (NAV) equal to T+Y−B if L>X−A, or if X and Y>0, or if X=0 and Y>B.

* * * * *